US012784539B2

(12) United States Patent
Macke et al.

(10) Patent No.: US 12,784,539 B2
(45) Date of Patent: Nov. 3, 2026

(54) INTEGRATED PAY BACK WAGERING GAMES

(71) Applicant: Primero Games, LLC, Norcross, GA (US)

(72) Inventors: Michael M. Macke, Duluth, GA (US); Barry W. Rutherford, Duluth, GA (US); Mark C. Nizdil, Duluth, GA (US)

(73) Assignee: Primero Games, LLC, Norcross, GA (US)

( * ) Notice: Subject to any disclaimer, the term of this patent is extended or adjusted under 35 U.S.C. 154(b) by 261 days.

(21) Appl. No.: 18/603,940

(22) Filed: Mar. 13, 2024

(65) Prior Publication Data

US 2025/0292651 A1 Sep. 18, 2025

(51) Int. Cl.
*G07F 17/32* (2006.01)

(52) U.S. Cl.
CPC ...... *G07F 17/3244* (2013.01); *G07F 17/3209* (2013.01); *G07F 17/3213* (2013.01); *G07F 17/3295* (2013.01); *G07F 17/3262* (2013.01)

(58) Field of Classification Search
None
See application file for complete search history.

(56) References Cited

U.S. PATENT DOCUMENTS

2021/0183205 A1* 6/2021 Meister-Gronau ... G06Q 20/045
2022/0270437 A1* 8/2022 Indrakumar ........ G07F 17/3258
2024/0428650 A1* 12/2024 Macke ................ G07F 17/3213
2024/0428652 A1* 12/2024 Macke ................ G07F 17/3251

* cited by examiner

*Primary Examiner* — Ronald Laneau
(74) *Attorney, Agent, or Firm* — Bradley Arant Boult Cummings LLP; Adam J. Thompson, Esq.

(57) ABSTRACT

The gaming device can generate an outcome for a first portion of a wagering game. The outcome can include multiple indicia. The gaming device can render a user interface with the indicia for a second portion of the wagering game. The gaming device can generate a skill-based game using the indicia as the selectable components for the skill-based game. The gaming device can receive inputs corresponding to the indicia and determine an award for the wagering game based on the inputs.

18 Claims, 7 Drawing Sheets

200

INTEGRATED PAY BACK WAGERING GAMES

TECHNICAL FIELD

The present systems and processes relate to utilizing computing technology to provide integrated pay back wagering games.

BACKGROUND

Users and patrons of gaming systems and devices may lose money playing wagering games in a short period of time. Patrons may be discouraged from playing wagering games due to the chance of losing their bet during play. If patrons could win back their bet amount when they lose, the patrons may be encouraged to play the game. Therefore, there is a long-felt but unresolved need for gaming technology to facilitate integrated pay back within wagering games.

BRIEF SUMMARY OF THE DISCLOSURE

Aspects of the present disclosure generally relate to integrated pay back for wagering games. The wagering game can include a first portion and a second portion. The first portion can include receiving a bet amount and generating an outcome based on the results of a random number algorithm. The second portion can include a skill-based game that can be generated if the outcome to the first portion is a losing outcome. If the outcome to the second portion is a winning outcome, an award can be generated for the wagering game and can include a percentage of the bet amount (e.g., 0% to 200%). For example, if the outcome to the first portion is a losing outcome, but the outcome to the second portion is a winning outcome, the award can be 100% of the bet amount.

To play the wagering game, the gaming system can generate user interfaces. The user interfaces can be different, similar, or identical for the first portion and the second portion. For example, the user interface for the first portion can prompt the user to select a bet amount. After receiving the bet amount, the outcome for the first portion can be generated. If the outcome to the first portion is a losing outcome, the gaming system can generate the user interface for the skill-based game. The user interface for the skill-based game can prompt the user to accept or decline playing the skill-based game. If the gaming system receives input accepting the skill-based game, the gaming system can generate the skill-based game. The gaming system can generate different types of skill-based games.

For example, gaming system can shuffle or rearrange indicia from the first portion of the wagering game. The gaming system can highlight some or all of the indicia and prompt the user to provide inputs based on the highlighted indicia. The gaming system can receive the input and determine if the selections correspond (e.g., match) the highlighted indicia. The gaming system can determine the outcome for the skill-based game based on the inputs (e.g., if the selects correspond to the highlighted indicia). As another example, the gaming system can determine a quantity of indicia eligible for shuffling, rearranging, repositioning, or remaining stationary (e.g., holding) and prompt the user to select eligible indicia. The gaming system can receive the input and move or change the indicia based on the selections. After moving or changing the indicia, the gaming system can determine the outcome for the skill-based game.

The award for the wagering game can depend on the outcome to the first portion and second portion. For example, if the outcome to the first portion is a winning outcome, the skill-based game may not be generated and the outcome may not change to award to the wagering game. As another example, if the outcome to the first portion is a losing outcome and the outcome to the skill-based game is a winning outcome, the award for the wagering game can be a percentage of the bet amount (e.g., 0% to 200%). As another example, if the outcome to the first portion is a losing outcome and the outcome to the skill-based game is a losing outcome, the award for the wagering game can be zero.

The above and further features of the disclosed systems and methods will be recognized from the following detailed descriptions and drawings of various embodiments.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
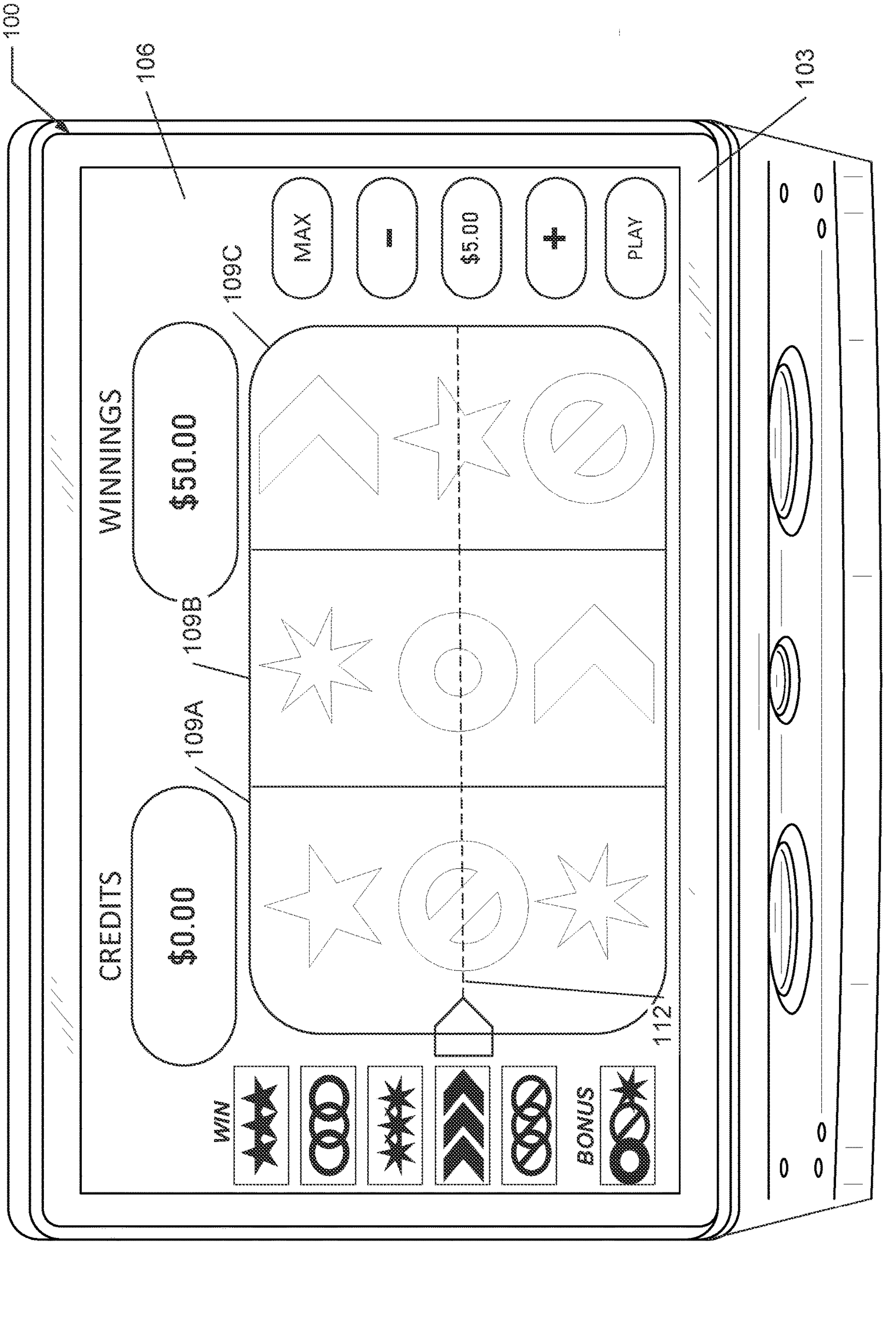
FIG. 1A illustrates an exemplary wagering game according to various embodiments of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Exemplary Embodiments

Figure 1B:
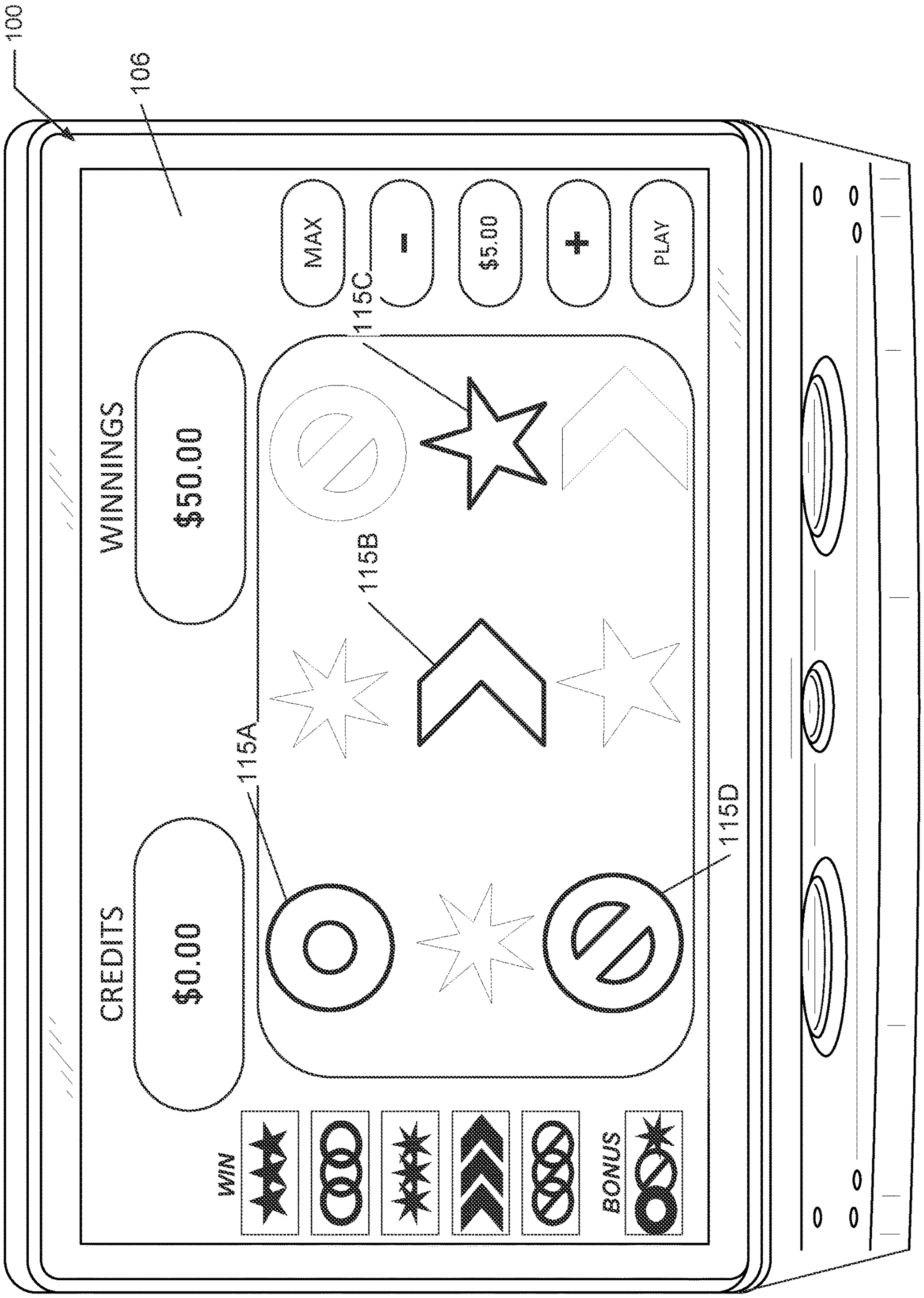
FIG. 1B illustrates an exemplary wagering game according to various embodiments of the present disclosure.

Referring now to the figures, for the purposes of example and explanation of the fundamental processes and components of the disclosed systems and processes, reference is made to FIG. 1, which illustrates the exemplary integrated pay back wagering game 100. The wagering game 100 can be played on a gaming device 103. The gaming device 103 can include a gaming cabinet, an amusement device, a slot machine, or other gaming device with a processor-based system such as a computer system. The wagering game 100 can include a first portion and a second portion. The second portion can include a skill-based game. The wagering game 100 can be played via the user interfaces displayed on the display 106. The user interface can include multiple strips or reels 109A, 109B, and 109C. As will be understood, while the exemplary wagering game 100 shown illustrates three strips, the wagering game 100 can include any number of strips (e.g., 3, 5, 8, 12 strips). Each strip can include multiple indicia (e.g., symbols) positioned randomly along the strip. After receiving a bet for the wagering game 100, each strip can be shuffled and then stopped based on the results from a random number generation algorithm. When the indicia strips stop shuffling, one or more indicia can be positioned along a pay line 112. As will be understood, while the exemplary wagering game 100 shown illustrates one pay line, the wagering game 100 can include any number of pay lines (e.g., 1, 3, 5, 7, 9, 12, 15 pay lines). When the indicia strips stop shuffling, the outcome can be determined to be a losing outcome or a winning outcome based on the indicia positioned along the pay line 112. For example, a winning outcome can include identical indicia positioned along a selected pay line. As another example, a winning outcome can include a predetermined indicia or combination or indicia along a selected pay line. A losing outcome can include any outcome that is not a winning outcome. For example, as illustrated by FIG. 1A, the combination of indicia positioned along the pay line 112 can be a losing combination of indicia.

After generating the losing outcome, the wagering game 100 can render a user interface for the second portion (e.g., the skill-based game) on the display 106. The wagering game 100 can include rearranging the indicia shown on the display 106. After rearranging the indicia, the wagering game 100 can individually highlight some or all of the indicia. For example, the wagering game 100 can highlight indicia 115A, 115B, 115C, and 115D. The wagering game 100 can highlight the indicia in an order or sequence. For example, the wagering game 100 can highlight indicia 115D first, followed by indicia 115B, followed by indicia 115A, and finally indicia 115C. The wagering game 100 can monitor for inputs selecting the indicia in the order highlighted. For example, the wagering game 100 can identify a correct sequence when a user input is received for indicia 115D, followed by indicia 115B, followed by indicia 115A, and finally indicia 115C. The wagering game 100 can briefly highlight indicia 115D for a period of time (e.g., a fraction of a second, 1 second, multiple seconds) or continually highlight indicia 115D (e.g., indicia 115D can remain highlighted while the wagering game 100 proceeds to either highlighting the next indicia or receiving input). After highlighting the indicia 115D, the wagering game 100 can highlight the next indicia (e.g., indicia 115B) and unhighlight indicia 115D. Once all indicia in a sequence have been highlighted, the wagering game 100 can receive a sequence of inputs and compare those user inputs to the sequence in which the indicia were highlighted. In some embodiments, the wagering game 100 can iteratively perform the sequence of highlighting and user inputs adding a new indicia during each iteration until a predefined number of indicia are in the sequence. As an example, the wagering game 100 can perform a first sequence with only indicia 115D in a first iteration. In a second iteration, the wagering game 100 can perform a sequence with indicia 115D followed by indicia 115B. In a third iteration, the wagering game 100 can perform a sequence with indicia 115D first, followed by indicia 115B, and followed by indicia 115A. In a fourth iteration, the wagering game 100 can perform a sequence with indicia 115D first, followed by indicia 115B, followed by indicia 115A, and indicia 115C. If the user selects an incorrect sequence for any one of the iterations, the wagering game 100 can determine a losing outcome and end the skill-based game. If the user selects the correct sequence for each of the iterations, the wagering game 100 can determine a winning outcome.

In some embodiments, the wagering game can receive input from the user after indicia 115D is highlighted. If the wagering game 100 receives the input before highlighting the next indicia, the wagering game 100 can indicate that the user should select the indicia that was highlighted (e.g., indicia 115D). If the user selects the correct indicia (e.g., indicia 115D), the wagering game 100 can highlight the next indicia (e.g., 115B). If the user selects the incorrect indicia (e.g., any indicia other than indicia 115D), the skill-based game can end and the outcome can be a losing outcome. If the user continues selecting the correct indicia as the indicia are highlighted, the outcome can be a winning outcome. If the outcome to the skill-based game is a winning outcome, an award for the wagering game 100 can be determined. For example, the award can be a percentage of the bet amount (e.g., 0% to 200% of the bet amount) for the wagering game 100.

Figure 2:
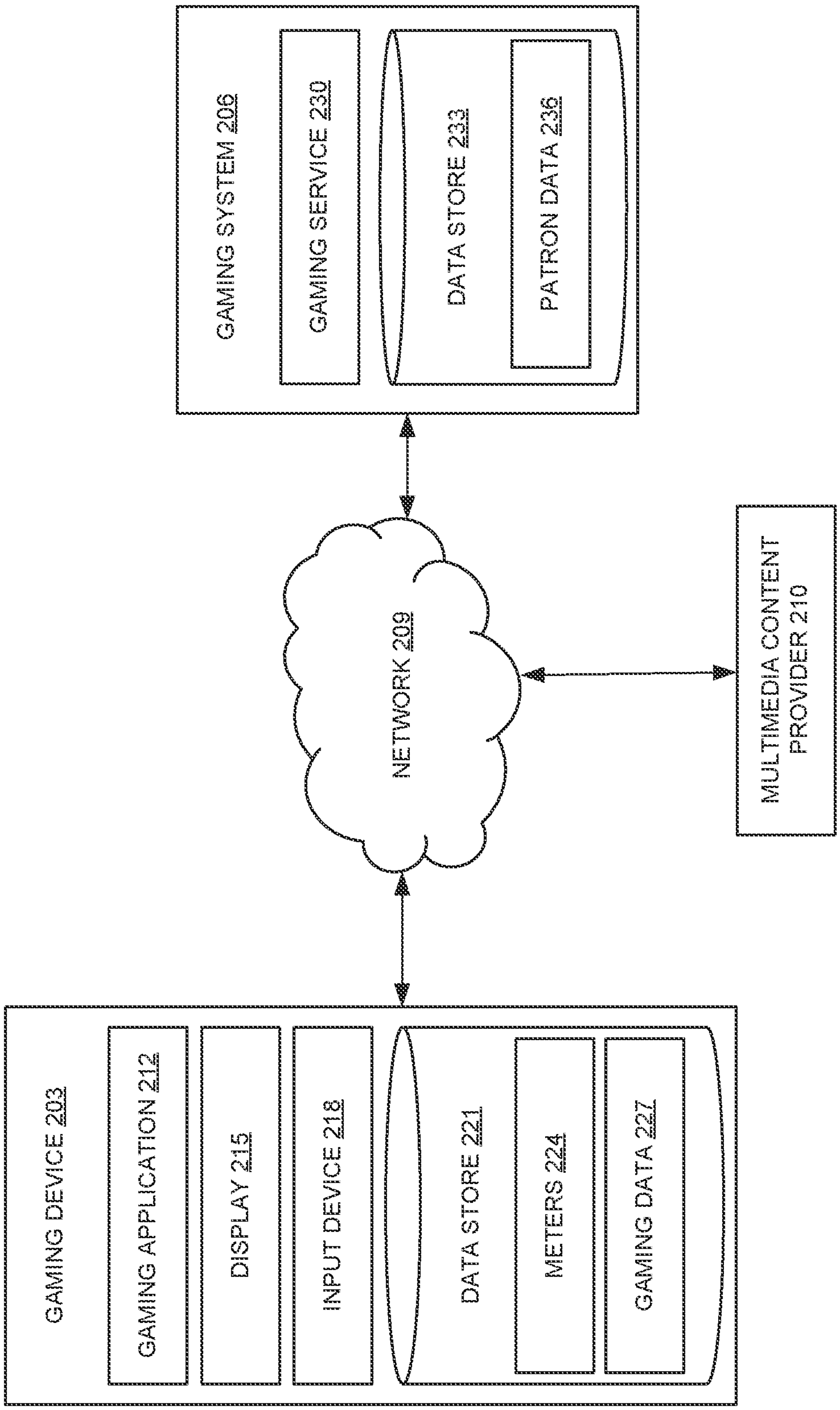
FIG. 2 illustrates an exemplary networked environment according to various embodiments of the present disclosure.

Referring now to FIG. 2, shown is an exemplary networked environment 200 for the patron verification system according to various embodiments of the present disclosure. As will be understood and appreciated, the exemplary networked environment 200 shown in FIG. 2 represents merely one approach or embodiment of the present system, and other aspects are used according to various embodiments of the present system. Exemplary networked environment 200 can include, but is not limited to, a gaming device 203, the gaming system 206, and the multimedia content provider 210 connected over a network 209.

According to various embodiments, the gaming device 203 can include any device capable of accessing network 209 including, but not limited to, a computer, smartphone, tablets, or other device. The gaming device 203 can be a gaming cabinet, an amusement device, a slot machine, or other gaming device with a processor-based system such as a computer system. The gaming device 203 can include a processor and a data store 221. The gaming device 203 can include a display 215 on which various user interfaces can be rendered to allow users to configure, monitor, control, and command various functions of the gaming application 212. The gaming device 203 can include the input device 218 for a user to provide various inputs (e.g., selections, wagers, credentials). The input device 218 can include one or more buttons, touch screens including three-dimensional or pressure-based touch screens, camera, finger print scanners, accelerometer, retinal scanner, gyroscope, magnetometer, or other input devices. The input device 218 can also include a bill acceptor, a player tracking module, a ticket printer, or some other device. The data store 221 can store data from the gaming device 203, including but not limited to the meters 224 and the gaming data 227.

In various embodiments, gaming device 203 can include multiple computing devices. Regardless, the gaming device 203 can include one or more processors and memory having instructions stored thereon that, when executed by the one or more processors, cause the gaming device 203 to perform one, some, or all of the actions, methods, steps, or functionalities provided herein. The gaming device 203 can be configured to execute various applications, such as the gaming application 212 and/or other applications. The gaming application 212 may be executed by the gaming device 203, for example, to access network content served up by the gaming system 206, and/or other servers, thereby rendering various user interfaces on the display 215. While the specification discusses various functionality as being performed by the gaming application 212 or the gaming service 230, it is understood that this functionality may be performed by the gaming service 230, gaming application 212, or both in coordination.

The gaming application 212 can generate user interfaces for the wagering games. The gaming application 212 can generate different, similar, or identical user interfaces for the first portion and the second portion of the wagering games. The user interfaces can include multiple indicia (e.g., symbols). The indicia can be arranged in a grid, in a pattern, randomly, or positioned on indicia strips. The gaming application 212 receive bets and generate outcomes for the first portion of the wagering game. If the outcome is a winning outcome, the gaming application 212 can determine an award for the wagering game without generating the second portion (e.g., the skill-based game). If the outcome is a losing outcome, the gaming application 212 can render the user interface for the second portion. The gaming application 212 can prompt the user to accept or decline to play the second portion and receive the user's selection.

The gaming application 212 can generate different types of skill-based games. For example, the type of skill-based game can be predetermined, based on input from the user, based on input from the gaming system 206, the outcome of the first portion of the wagering game, based on the meters 224, based on the patron data 236, or based on the gaming data 227. For example, the gaming application 212 can shuffle or rearranging the indicia shown on the display 215, highlight some or all of the indicia, and prompt the user to provide inputs based on the highlighted indicia. The gaming application 212 can receive the input and determine if the selections correspond (e.g., match) the highlighted indicia. If the selections correspond to the highlighted indicia, the outcome for the skill-based game can be a winning outcome and the gaming application 212 can determine an award for the wagering game. If the outcome for the skill-based game is a losing outcome, the gaming application 212 can determine that the award for the wagering game is zero. As another example, the gaming application 212 can determine a quantity of indicia eligible for shuffling, rearranging, repositioning, or remaining stationary (e.g., holding) and prompt the user to select eligible indicia. The gaming application 212 can receive the input and move or change the indicia based on the selections. After moving or changing the indicia, the gaming application 212 can determine the outcome for the skill-based game and determine the award for the wagering game based on the outcome.

The gaming application 212 can modify the meters 224 stored in the data store 221, such as the current hand count meter, the coin-in meter, and the current credits meter. For example, the gaming application 212 can increase the current hand count meter each time a wagering game is played. The gaming application can increase or decrease the current credits meter based on the award of the wagering game. The gaming application 212 can receive a request to cash out (e.g., initiate a payout event) from the input device 218.

The gaming application 212 can prompt the patron to provide credentials for a patron account associated with the gaming system 206. The gaming application 212 can authenticate the user via a player tracking module, a radio frequency identifier (RFID) reader, a card reader, a near field communication (NFC), such as Bluetooth circuitry, Wi-Fi circuitry, or other wireless antenna-based technology. In some embodiments, the patron can insert a patron tracking card into the gaming device 203 to authenticate the patron account. In another embodiment, the gaming device 203 can read a user identifier associated with the patron from using near field communication (NFC).

The elements of the gaming system 206 can be provided via one or more computing devices that may be arranged, for example, in one or more server banks or computer banks or other arrangements. Such computing devices can be located in a single installation or may be distributed among many different geographical locations. For example, the gaming system 206 can include one or more computing devices that together may include a hosted computing resource, a grid computing resource, or any other distributed computing arrangement. In some cases, the gaming system 206 can correspond to an elastic computing resource where the allotted capacity of processing, network, storage, or other computing-related resources may vary over time. Regardless, the gaming system 206 can include one or more processors and memory having instructions stored thereon that, when executed by the one or more processors, cause the gaming system 206 to perform one, some, or all of the actions, methods, steps, or functionalities provided herein.

The gaming system 206 can include a gaming service 230 and the data store 233. The gaming service 230 can correspond to one or more software executables that can be executed by the gaming system 206 to perform the functionality described herein. Various data can be stored in the data store 233, including but not limited to, the patron data 236.

The gaming service 230 can communicate with multiple gaming devices 203. The gaming service 230 can receive and transmit messages and data with multiple gaming devices 203. The gaming service 230 can receive the credentials for the patron account from the gaming application 212. The gaming service 230 can associate the outcomes and awards from the wagering game to the patron account as the patron data 236.

The multimedia content provider 210 can include one or more processors and memory having instructions stored thereon that, when executed by the one or more processors, cause the multimedia content provider 210 to perform one, some, or all of the actions, methods, steps, or functionalities provided herein. The multimedia content provider 210 receives a request for multimedia content from the gaming application 212 or the gaming service 230. The multimedia content provider 210 can transmit the multimedia content to the gaming application 212 or the gaming service 230. Once the multimedia content has been presented, the multimedia content provider can send a successful completion message to the gaming application 212 or the gaming service 230.

The network 209 can include, for example, the Internet, intranets, extranets, wide area networks (WANs), local area networks (LANs), wired networks, wireless networks, or other suitable networks, etc., or any combination of two or more such networks.

Figure 3:
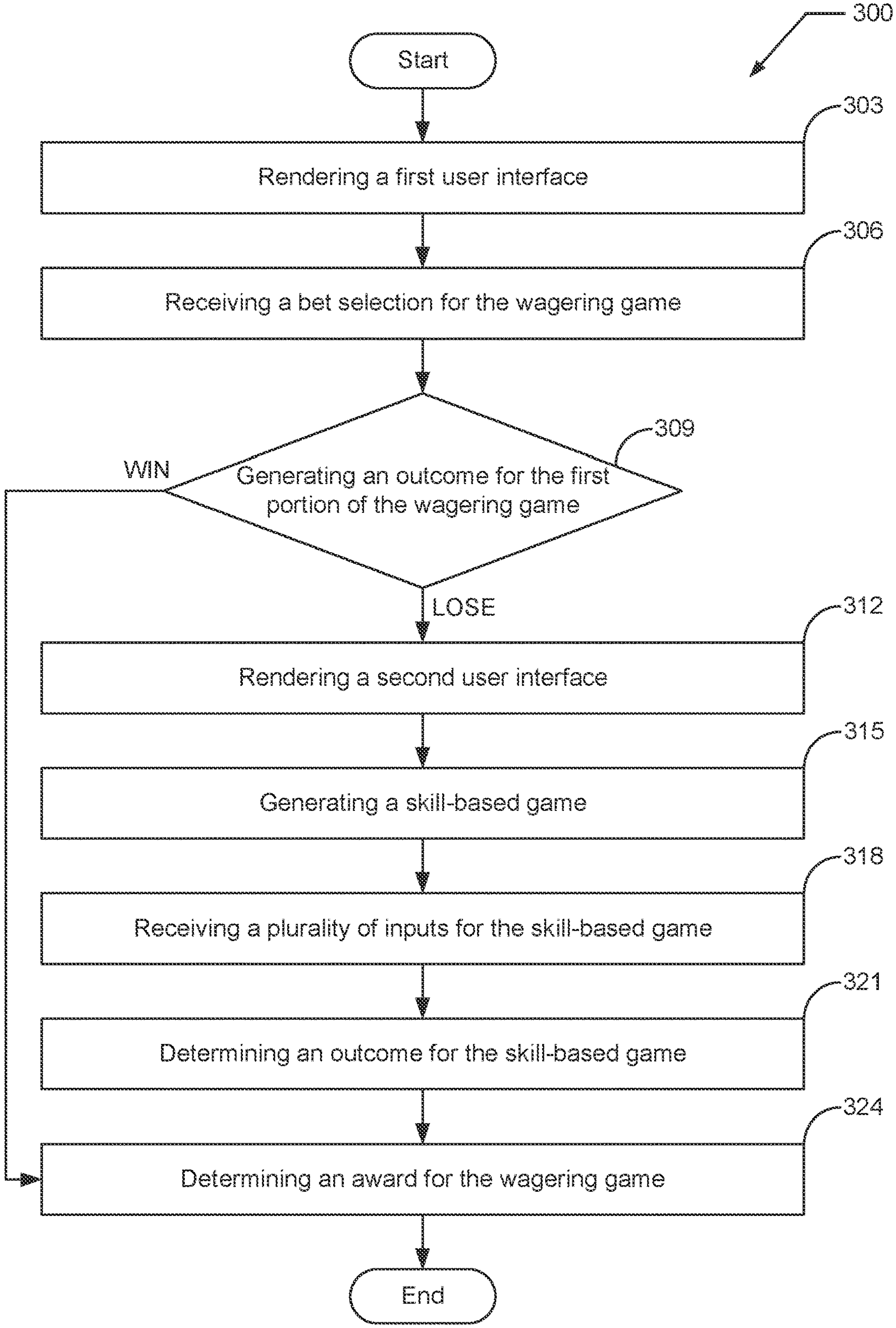
FIG. 3 illustrates an exemplary overall process for the disclosed system according to various embodiments of the present disclosure.

Referring now to FIG. 3, shown is an exemplary, high-level overview process 300 according to various embodiments of the present disclosure. As will be understood by one having ordinary skill in the art, the steps and processes shown in FIGS. 3-6 may operate concurrently and continuously, are generally asynchronous and independent, can be performed in part or in whole by a combination of one or more of the gaming device 203 and the gaming system 206, and are not necessarily performed in the order shown and various steps can be executed linearly or in parallel. Process 300 can be performed entirely, partially, or in coordination with the gaming application 212 and the gaming service 230.

At step 303, the process 300 can include rendering a first user interface for a wagering game. The gaming application 212 can render a first user interface for a wagering game on the display 215. The first user interface can be used for the first portion of the wagering game. The first user interface can include multiple indicia strips on multiple reels. Each indicia strip can include multiple indicia (e.g., symbols). The indicia can be positioned in a pattern or randomly positioned on the indicia strip. The first interface can include one or more pay lines. The first user interface can prompt the user to provide or select a bet, including a bet amount.

At step 306, the process 300 can include receiving a bet selection for the wagering game. The gaming application 212 can receive a bet selection for the wagering game. The bet selection can include a bet amount and selected pay lines. The bet selection can be used for the first portion of the wagering game. The bet selection can be received via the display 215 or the input device 218.

At step 309, the process 300 can include generating an outcome for the first portion of the wagering game. The gaming application 212 can generate an outcome for the first portion of the wagering game. The outcome can be generated by shuffling the indicia strips on the reels. The indicia strips can be shuffled and then stopped based on the results from a random number generation algorithm. When the indicia strips stop shuffling, one or more indicia can be positioned along the selected pay lines. Based on the indicia positioned along the selected pay lines, the outcome can be a winning outcome or a losing outcome. For example, a winning outcome can include identical indicia positioned along a selected pay line. As another example, a winning outcome can include a predetermined indicia or combination or indicia along a selected pay line. A losing outcome can include any outcome that is not a winning outcome. The outcome can include the indicia positioned along the selected pay lines. If the outcome is a winning outcome, the process 300 can proceed to step 324. If the outcome is a losing outcome, the process 300 can proceed to step 312. In some embodiments, the process 300 can proceed to step 312 or step 324 regardless of the outcome.

At step 312, the process 300 can include rendering a second user interface. The gaming application 212 can render the second user interface on the display 215. The second user interface can prompt the user to accept or decline the skill-based game (e.g., the second portion of the wagering game. If the user accepts the skill-based game, the process 300 can proceed to step 315. If the user declines the skill-based game, the process 300 can proceed to step 324.

The second user interface can be used for the skill-based game. The second user interface can vary based on the type of skill-based game. The second user interface can include the same indicia from the first user interface. The second user interface can include the indicia positioned along the selected pay line when the outcome is generated for the first portion. The second user interface can include all or some of the indicia on the display 215 when the outcome is generated for the first portion. For example, the second user interface can include indicia exclusively from the first portion of the wagering game. The second user interface can include highlighting, rearranging, or shuffling the indicia for the skill-based game. As an example, the second user interface can include highlighting or shuffling all or some of the indicia shown on the display 215 when the outcome is generated for the first portion. The indicia included in the second user interface can act as the selectable components for the skill-based game. As will be understood, the second user interface will be discuss further in reference to FIGS. 4-6.

At step 312, the process 300 can include generating a skill-based game. The gaming application 212 can generate the skill-based game. The skill-based game can be the second portion of the wagering game. The skill-based game can include different types of skill-based games. For example, the type of skill-based game can be predetermined, based on input from the user, based on input from the gaming system 206, the outcome of the first portion of the wagering game, based on the meters 224, based on the patron data 236, or based on the gaming data 227. As will be understood, FIGS. 4-6 can provide non-limiting examples of the skill-based game. The skill-based game can be generated using the second user interface. For example, the skill-based game can include multiple indicia as the selectable components in the second user interface. As another example, the skill-based game can include indicia exclusively from the first portion (e.g., shown on the display 215 when the outcome was generated, included in the first portion) as the selectable components in the second user interface.

The skill-based game can be generated based on the outcome of the first portion of the wagering game. For example, if the outcome is a losing outcome, the gaming application 212 can render the second user interface on the display 215 and generate the skill-based game. As another example, if the outcome is a winning outcome, the gaming application 212 may not render the second user interface on the display 215 or generate the skill-based game. The skill-based game can be generated based on input from the user. For example, the user can decline to play the skill-based game and the gaming application 212 can determine an award for the wagering game. If the user accepts playing the skill-based game, the gaming application 212 can generate the skill-based game. The duration of the skill-based game can be several times longer than the duration of the first portion (e.g., twice as long, 5 times longer, 10 times longer, 20 times longer, 30 times longer).

At step 318, the process 300 can include receiving inputs for the skill-based game. The gaming application 212 can receive the inputs for the skill-based game via the display 215 or the input device 218. The inputs can depend on the type of skill-based game generated. The inputs can include, but are not limited to, selected indicia from the second user interface, selected indicia strips or reels, bet or credits amount, and pay lines.

At step 321, the process 300 can include determining an outcome for the skill-based game. The gaming application 212 can determine the outcome for the skill-based game. The outcome of the skill-based game can depend on the inputs received at step 318. The received inputs can be analyzed to determine the outcome of the skill-based game. The outcome can depend on the type of skill-based game generated. For example, the skill-based game can involve multiple inputs. If one of the multiple inputs is incorrect or wrong, the outcome can be a losing outcome and the skill-based game can end.

At step 324, the process 300 can include determining an award for the wagering game. The gaming application 212 can determine the award for the wagering game. The award can depend on the outcome of the first portion and the outcome of the skill-based game. For example, if the outcome of the first portion is a losing outcome and the outcome of the skill-based game is a winning outcome, the award can be a percentage of the bet amount (e.g., any percentage from 0% to 200%). The award can be a refund of the bet amount lost due to the losing outcome for the first portion. The award can depend on the inputs received for the skill-based game. As another example, if the outcome to both the first portion and the skill-based game is a losing outcome, the award can be zero (e.g., no award). In some embodiments, the award can depend on either the outcome of the first portion or the outcome of the skill-based game. For example, if the outcome of the first portion is a winning outcome, the award may not depend on the outcome of the skill-based game (e.g., if the outcome of the first portion is a winning outcome, the award can be determined without generating the skill-based game). In some embodiments, if the outcome of the first portion is a losing outcome and the outcome of the skill-based game is one or more losing outcomes, the award can include an amount less than the bet amount (e.g., the award can be reduced due to the one or more losing outcomes in the skill-based game).

Figure 4:
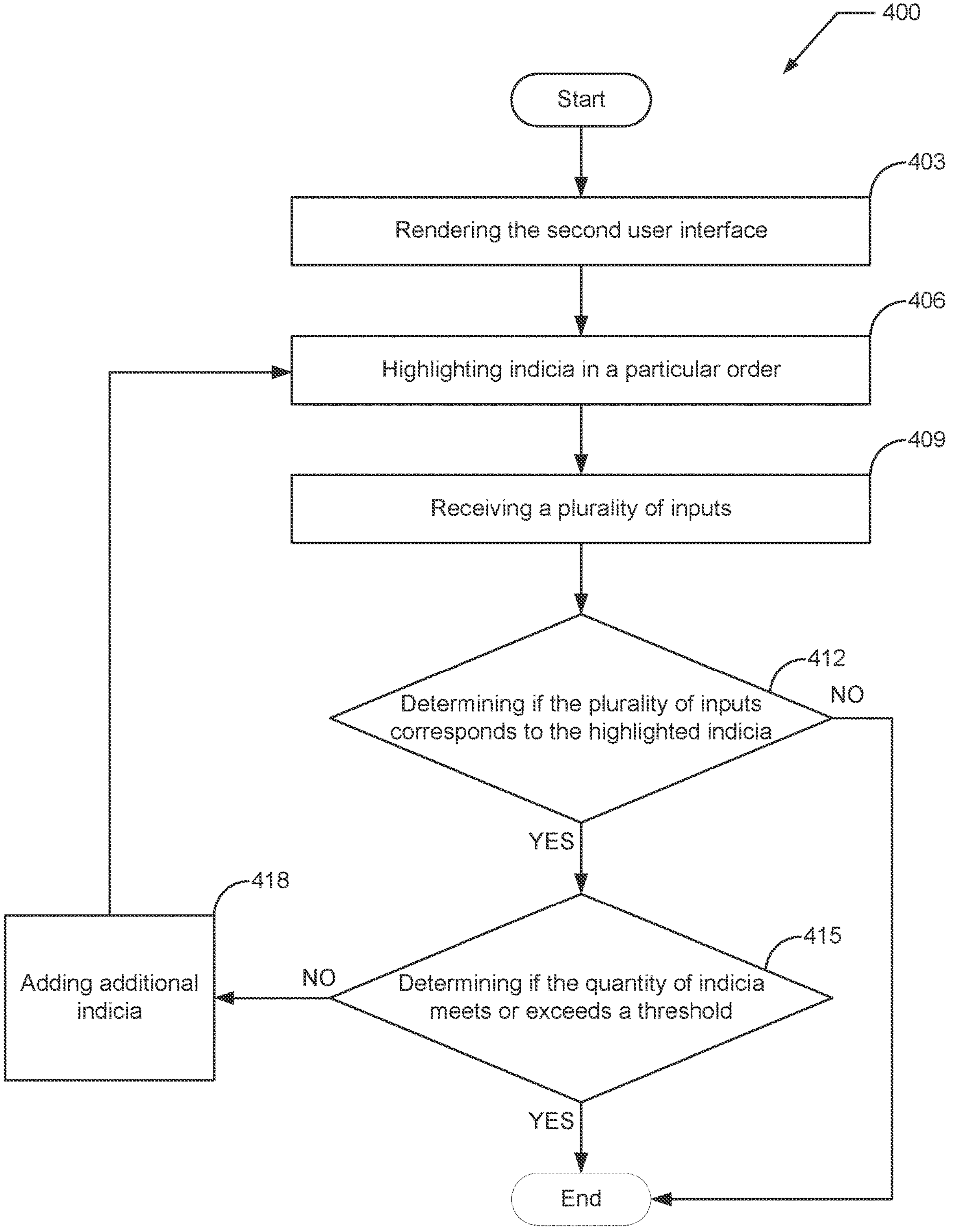
FIG. 4 illustrates an exemplary skill-based game generation process according to various embodiments of the present disclosure.

Referring now to FIG. 4, shown is an exemplary process 400 for generating a skill-based game according to various embodiments of the present disclosure. Process 400 can be performed entirely, partially, or in coordination with the gaming application 212 and the gaming service 230. At step 403, the process 400 can include rendering the second user interface for a wagering game. The gaming application 212 can render the second user interface for a wagering game on the display 215. The second user interface can include the same indicia from the first user interface. The second user interface can include the indicia positioned along the selected pay line when the outcome is generated for the first portion. The second user interface can include all or some of the indicia on the display 215 when the outcome is generated for the first portion. For example, the second user interface can include shuffling or rearranging the indicia shown on the display 215 when the outcome is shown or the indicia positioned on a pay line. Indicia that were included in strips or reels can be rearranged or shuffled into different arrangements, including a grid or line.

At step 406, the process 400 can include highlighting the indicia in a particular order. The gaming application 212 can highlight the indicia in a particular order. For example, one indicia, at a time, can be highlighted. As another example, two or more indicia can be highlighted simultaneously as a group. The one or more indicia can be highlighted in a particular order. Some or all of the indicia shown on the display 215 can be highlighted. The indicia can remain highlighted for a fraction of a second or one or more seconds (e.g., 2 seconds, 5 seconds, 10 seconds). The highlighting can include changing the color of the indicia, emphasizing the indicia, or adding a glow around the edge of the indicia. The highlighted indicia can indicate that a user should select the highlighted indicia as inputs. The highlighted indicia can remain highlighted while being selected as inputs or the highlighting can be removed prior to selection as inputs. The indicia can be iteratively highlighted and selected as inputs. For example, the indicia can be highlighted, followed by the indicia being selected as inputs, and this process can repeat iteratively for the duration of the skill-based game.

At step 409, the process 400 can include receiving input. The gaming application 212 can receive the inputs via the display 215 or the input device 218. The inputs can include selected indicia and can be received iteratively. The inputs can be received as a sequence of indicia (e.g., multiple indicia selected in an order). Any of the indicia shown on the display 215 can be selected as inputs. Both highlighted and non-highlighted indicia can be selected as inputs. For example, the inputs can include all highlighted indicia, no highlighted indicia, or a mix of both highlighted and non-highlighted indicia. The indicia can be selected as inputs in any order. For example, the indicia can be selected in the same order as the indicia were highlighted (e.g., the indicia are highlighted in a particular order, then the highlighted indicia were selected in the same order). As another example, the indicia can be selected in a different order than as the indicia were highlighted. The inputs can be received after the indicia are highlighted or while the indicia are highlighted. In some embodiments, the skill-based game can include a time limit for receiving the inputs.

At step 412, the process 400 can include determining if the inputs correspond to the highlighted indicia. The gaming application 212 can determine if the inputs correspond to the highlighted indicia. For the outcome of the skill-based game to be a winning outcome, the skill-based game can determine that both the selected indicia match the highlighted indicia and the order that the indicia were selected match the order the indicia were highlighted. In some embodiments, for the outcome of the skill-based game to be a winning outcome, the skill-based game can determine that the selected indicia match the highlighted indicia and allow the indicia to be selected in any order. The selected indicia (e.g., the received inputs) can be compared to the highlighted indicia. The order that the indicia were selected can be compared to the order the indicia were highlighted. If the inputs correspond to the highlighted indicia (e.g., the selected indicia match the highlighted indicia, the order that the indicia were selected match the order the indicia were highlighted), the process 400 can proceed to step 415. In some embodiments, if all of the indicia were highlighted, then any of the received inputs can correspond to the highlighted indicia.

If the inputs do not correspond to the highlighted indicia (e.g., the selected indicia do not match the highlighted indicia, the order that the indicia were selected does not match the order the indicia were highlighted), the outcome for the skill-based game can be a losing outcome and the process 400 can end. After the process 400 ends, an award can be determined for the wagering game as described in reference to step 324 in process 300. For example, if the outcome to the skill-based game is a losing outcome (e.g., the inputs do not correspond to the highlighted indicia), the award can be determined to be zero. In some embodiments, if the inputs do not correspond to the highlighted indicia (e.g., the selected indicia do not match the highlighted indicia, the order that the indicia were selected does not match the order the indicia were highlighted), the process 400 can return to step 406. The gaming application 212 can replay highlighting the order of the indicia when an incorrect match is selected. In these embodiments, steps 406-415 can continue for a predetermined amount of time or a predetermined number of iterations. In other embodiments, if the inputs do not correspond to the highlighted indicia (e.g., the selected indicia do not match the highlighted indicia, the order that the indicia were selected does not match the order the indicia were highlighted), the process 600 described in FIG. 6 can begin and multimedia content can be presented to the user. For example, multimedia content can be presented to the user explaining how to provide the correct input that corresponds to the highlighted indicia and the skill-based game can continue after the multimedia is presented. In another example, the multimedia content can include a video advertisement and the skill-based game can continue after the multimedia content is presented.

At step 415, the process 400 can include determining if the quantity of indicia meets or exceeds a threshold. The gaming application 212 can determine if the quantity of indicia meet a threshold. The quantity of indicia can include the quantity of indicia highlighted, the quantity of indicia selected that match the highlighted indicia, or the quantity of indicia selected regardless of the selected indicia matching the highlighted indicia. The threshold can be predetermined, based on input from the user, based on input from the gaming system 206, the outcome of the first portion of the wagering game, based on the skill-based game, based on the meters 224, based on the patron data 236, or based on the gaming data 227. If the quantity of indicia meets or exceeds the threshold, the outcome for the skill-based game can be a winning outcome and the process 400 can end. After the process 400 ends, an award can be determined for the wagering game as described in reference to step 324 in process 300. For example, if the outcome to the skill-based game is a winning outcome (e.g., the quantity of indicia meets the threshold), the award can be a percentage of the bet amount (e.g., 0% to 200%). If the quantity of indicia fails to meet or exceed the threshold, the process 400 can proceed to step 418.

At step 418, the process 400 can include adding additional indicia. The gaming application 212 can add additional indicia. Adding additional indicia can include adding new or different indicia to the second user interface. Adding additional indicia can include highlighting indicia shown on the display 215. After step 418, the process 400 can repeat and proceed to step 406. As will be understood, the process 400 can repeat until either the quantity of indicia meets or exceeds the threshold or the inputs do not correspond to the highlighted indicia. In some embodiments, the process 400 can repeat until a predetermined amount of time has elapsed or the process 400 has repeated a predetermined number of iterations. If the gaming device 203 receives one or more incorrect inputs (e.g., losing outcomes) during the skill-based game, the award can be reduced based on the one or more incorrect inputs.

Figure 5:
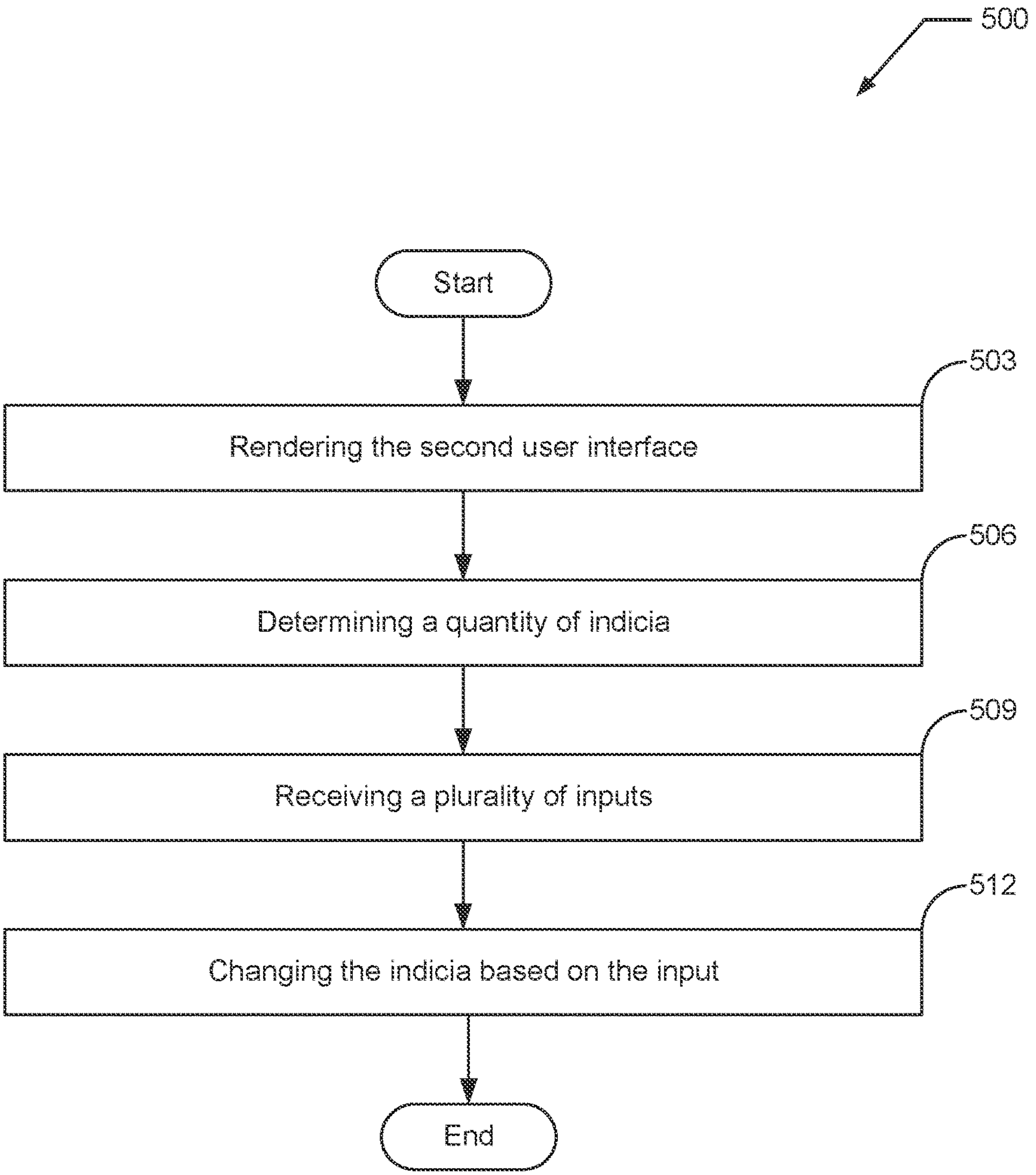
FIG. 5 illustrates an exemplary skill-based game generation process according to various embodiments of the present disclosure.

Referring now to FIG. 5, shown is an exemplary process 500 for generating a skill-based game according to various embodiments of the present disclosure. Process 500 can be performed entirely, partially, or in coordination with the gaming application 212 and the gaming service 230. At step 503, the process 500 can include rendering the second user interface for a wagering game. The gaming application 212 can render the second user interface for a wagering game on the display 215. The second user interface can include the same indicia from the first user interface. The second user interface can include the indicia positioned along the selected pay line when the outcome is generated for the first portion. The second user interface can include all or some of the indicia on the display 215 when the outcome is generated for the first portion. The second user interface can be identical or similar to the first user interface on the display 215 when the outcome is generated for the first portion. The second user interface can shuffle or rearrange the indicia within the strips or reels.

At step 506, the process 500 can include determining a quantity of indicia. The gaming application 212 can determine a quantity of indicia. The quantity of indicia can include a quantity of indicia, quantity of indicia strips, or quantity of indicia reels eligible for shuffling, repositioning, or remaining stationary (e.g., holding). Determining the quantity of indicia can include determining what movement (e.g., shuffling, repositioning, or remaining stationary) the quantity is eligible for. For example, one indicia strip can be eligible for repositioning one indicia in the up or down direction. As another example, two indicia strips can be eligible for shuffling. As another example, one indicia strip can be eligible for remaining stationary (e.g., holding) while the other indicia strips are shuffled. The quantity of indicia can be predetermined, based on input from the user, based on input from the gaming system 206, the outcome of the first portion of the wagering game, based on the meters 224, based on the patron data 236, or based on the gaming data 227. For example, if the outcome of the first portion includes two matching indicia and one different indicia positioned on the pay line, the quantity of indicia can be determined based on the outcome and can include repositioning one indicia strip up or down. After the quantity of indicia is determined, an indicator can be generated on the display 215. The indicator can correspond to the determined quantity of indicia and the eligible movement.

At step 509, the process 500 can include receiving inputs. The gaming application 212 can receive the inputs via the display 215 or the input device 218. The inputs can include selected indicia, selected indicia strip, or selected indicia reels shown on the display 215. The inputs can include a selected movement, including shuffling, repositioning, or remaining stationary. If the selected movement is repositioning, the inputs can include a number of indicia to reposition and a direction. The inputs can depend on the quantity of indicia determined at step 506. For example if the quantity of indicia determined includes one indicia strip eligible for repositioning one position, the input may not include two indicia strips. The input can include selected pay lines.

At step 512, the process 500 can include changing the indicia based on the input. The gaming application 212 can changing the indicia based on the input. The indicia can be changed in response to receiving the selected indicia, selected indicia strips, or selected indicia reels. For example, in response to receiving one selected indicia strip for repositioning up, the selected indicia strip can be positioned up one (e.g., the indicia strip is moved up one indicia). As another example, in response to receiving two selected indicia strips for remaining stationary, the non-selected indicia strips can be shuffled. After changing the indicia based on the input, an outcome for the skill-based game can be determined. For example, if changing the indicia positioned a winning combination of indicia along a pay line, the outcome can be a winning outcome. As another example, if changing the indicia did not position a winning combination of indicia along a pay line, the outcome can be a losing outcome. After determining the outcome for the skill-based game, the process 500 can end and an award can be determined for the wagering game as described in reference to step 324 in process 300. For example, if the outcome to the skill-based game is a winning outcome (e.g., changing the indicia positioned a winning combination of indicia along a pay line), the award can be a percentage of the bet amount (e.g., 0% to 200%). For example, if the outcome to the skill-based game is a losing outcome (e.g., changing the indicia did not position a winning combination of indicia along a pay line), the award can be zero.

Figure 6:
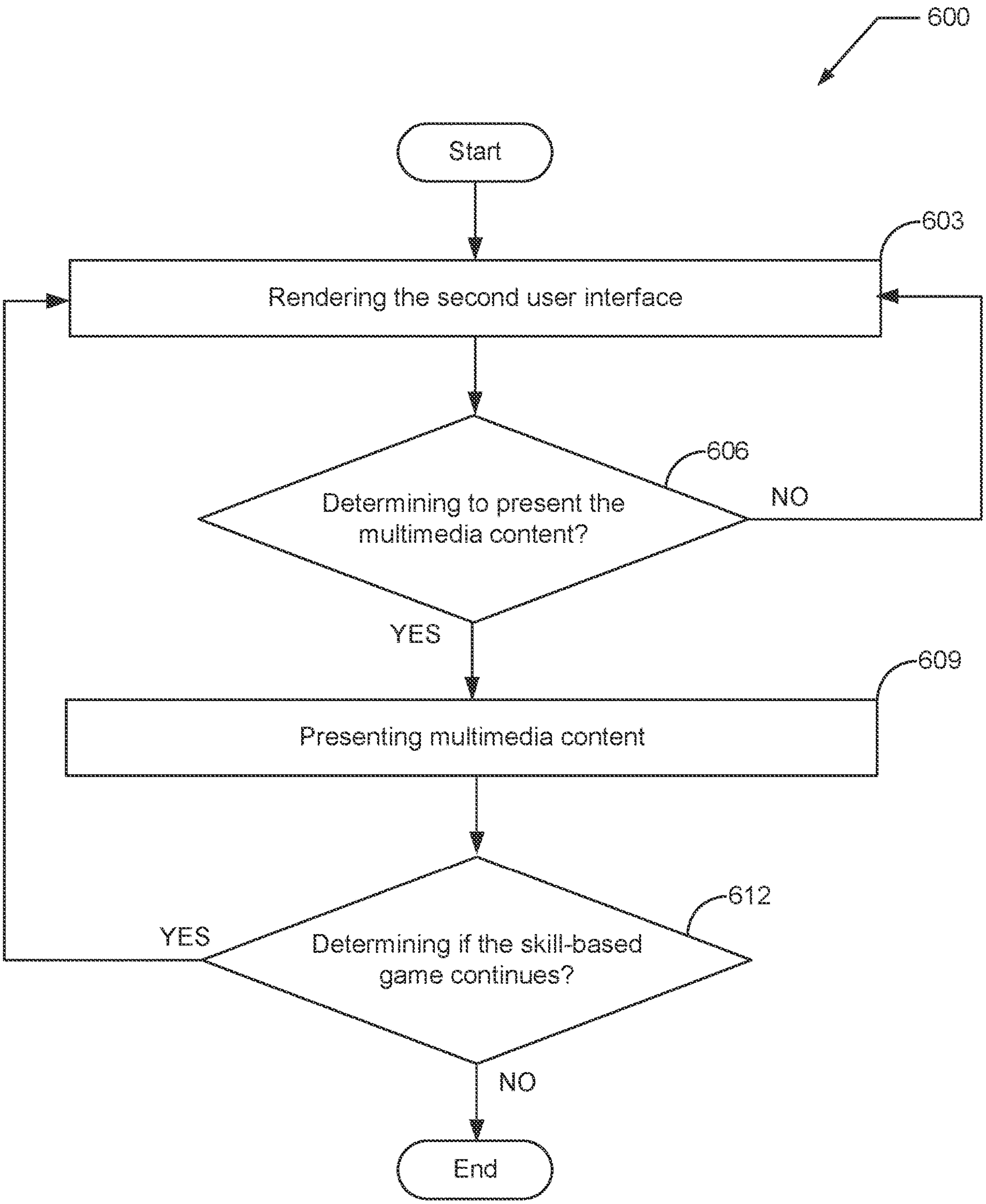
FIG. 6 illustrates an exemplary skill-based game with multimedia content generation process according to various embodiments of the present disclosure.

Referring now to FIG. 6, shown is an exemplary process 600 for generating a skill-based game with multimedia content according to various embodiments of the present disclosure. The process 600 can be performed entirely, partially, or in coordination with the gaming application 212, the gaming service 230, and the multimedia content provider 210. At step 603, the process 600 can include rendering the second user interface for a wagering game. The gaming application 212 can render the second user interface for a wagering game on the display 215. In one embodiment, the gaming application 212 can render the second user interface as part of the current user interface. For example, the game application 212 can render a pop up window on the display with streaming media content. In some embodiments, rendering the second user interface can include rendering the second user interface for the skill-based games described in non-limiting examples FIGS. 4 and 5. In some embodiments, the second user interface can include an interface for presenting the multimedia content. The multimedia content can include videos or visual graphics related to the skill-based game or an advertisement. For example, the multimedia content can include a video or visual graphic instructing the user how to correctly provide inputs for the skill-based game. In these embodiments, the second user interface can include replacing the indicia with a video player or superimposing a video player over the indicia.

At step 606, the process 600 can include determining whether to present the multimedia content. The gaming application 212 or the gaming service 230 can determine whether to present the multimedia content. The determination to present the multimedia content can be based on one or more of: input from the user, input from the gaming system 206, the outcome of the first portion of the wagering game, the meters 224, the patron data 236, or the gaming data 227. For example, the determination can be based on input from the user to not present the multimedia content. In this example, the user can pay to skip the multimedia content for this particular wagering game or to skip the multimedia content for some or all wagering games played by the user. The determination can be based on the outcome of the skill-based game. For example, if the user provides the incorrect input or selects the incorrect indicia, strips, and/or reels during the skill-based game, the gaming application 212 can determine that the multimedia content should be presented. In another example, if the user provides the correct input or selects the correct indicia, strips, and/or reels during the skill-based game, the gaming application 212 can determine that the multimedia content should not be presented. In another example, if the outcome of the skill-based game is a winning outcome, the gaming application 212 can determine that the multimedia content should not be presented. In another example, if the outcome of the skill-based game is a losing outcome, the gaming application 212 can determine that the multimedia content should be presented. In some embodiments, presenting the multimedia content can be based on a predetermination (e.g., a predetermination to present the multimedia content, a predetermination to not present the multimedia content). If a determination is made that the multimedia content should be presented, the process 600 can proceed to step 609. If a determination is made that the multimedia content should not be presented, the process 600 can return to 603 or the process 600 can end.

At step 609, the process 600 can include presenting the multimedia content. The gaming application 212 can present the multimedia content on the display 215. The multimedia content provider 210 can provide a URL to the gaming application 212 or gaming service 230. The gaming application 212 or the gaming service 230 can transmit a request for the multimedia content to the URL and the multimedia content provider 210 can transmit the multimedia content to be presented on the display 215. Once the multimedia content has been presented, the multimedia content provider 210 can transmit a successful completion message to the gaming application 212 or the gaming service 230 indicating that the multimedia content was successfully presented. For example, if the multimedia content is a video, the multimedia content provider 210 can transmit the successful completion message after the video finishes playing. For example, if the multimedia content is a visual graphic, the multimedia content provider 210 can transmit the successful completion message after the visual graphic has been presented for a predetermined period of time. In some embodiments, instead of presenting the multimedia content on the display 215, the gaming device 203 can prompt the user to provide an email address or phone number and the multimedia content can be transmitted to that email address or phone number to be presented to the user. In some embodiments, instead of the multimedia content provider 210 transmitting the multimedia content to the gaming application 212 or the gaming service 230, the multimedia content can be stored on the data store 221 or the data store 233.

At step 612, the process 600 can include determining whether the skill-based game should continue. The gaming application 212 or the gaming service 230 can determine whether the skill-based game should continue. The determination can be based on the determination at step 606. For example, the multimedia content was presented because of the gaming application 212 received incorrect inputs from the user during the skill-based game, a determination can be made that the skill-based game should continue after presenting the multimedia content. If, however, the multimedia content was not presented based on the skill-based game, a determination can be made that the skill-based game should not continue after presenting the multimedia content. If a determination is made that the skill-based game should continue after presenting the multimedia content, the process 600 can return to 603. If a determination is made that the skill-based game should not continue after presenting the multimedia content, the process 600 can end. After ending, an award for the wagering game can be determined as described in step 324 of the process 300. From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include non-transitory computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The processing unit can include one or more hardware processors. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In some embodiments, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein. While thresholds are discussed herein as being met when the threshold is exceeded, the system may determine a threshold is met when a value meets or exceeds the threshold.

Clause 1. A system, comprising: a display; a memory device; and at least one computing device communicatively coupled to the memory device and the display, the at least one computing device being configured to: generate an outcome for a first portion of a wagering game comprising a plurality of indicia; render a user interface comprising the plurality of indicia on the display; generate a skill-based game on the display using the plurality of indicia as selectable components for the skill-based game; receive a plurality of inputs individually corresponding to a respective one of the plurality of indicia; and determine an award for the wagering game based on the plurality of inputs.

Clause 2. The system of clause 1 or any other clause herein, wherein the at least one computing device is further configured to analyze the plurality of inputs to determine an outcome of the skill-based game, wherein the award is based on the outcome of the skill-based game.

Clause 3. The system of clause 2 or any other clause herein, wherein the at least one computing device is further configured to determine the award as a percentage of a bet amount based on the outcome for the first portion of the wagering game being a losing outcome and the outcome of the skill-based game being a winning outcome.

Clause 4. The system of clause 1 or any other clause herein, wherein the at least one computing device is further configured to generate the skill-based game by: highlighting individual ones of a plurality of the plurality of indicia in a particular order; and determining whether the plurality of inputs correspond to the plurality of the plurality of indicia in the particular order.

Clause 5. The system of clause 1 or any other clause herein, wherein the at least one computing device is further configured to generate the skill-based game on the display based on the outcome of the wagering game.

Clause 6. The system of clause 5 or any other clause herein, wherein the at least one computing device is further configured to generate the skill-based game on the display in response to the outcome of the wagering game being a losing outcome.

Clause 7. The system of clause 1 or any other clause herein, wherein the at least one computing device is further configured to: receive a selection of a bet amount; generate the outcome for the first portion of the wagering game by: shuffling a plurality of indicia strips on a plurality of reels, the plurality of indicia strips comprise the plurality of indicia; and stopping the plurality of indicia strips at a position based on a result from a random number generation algorithm.

Clause 8. A method, comprising: generating, via one of one or more computing devices, an outcome for a first portion of a wagering game comprising a plurality of indicia; rendering, via one of the one or more computing devices, a user interface comprising the plurality of indicia on a display; generating, via one of the one or more computing devices, a skill-based game on the display using the plurality of indicia as selectable components for the skill-based game; receiving, via one of the one or more computing devices, a plurality of inputs individually corresponding to a respective one of the plurality of indicia; and determining, via one of the one or more computing devices, an award for the wagering game based on the plurality of inputs.

Clause 9. The method of clause 8 or any other clause herein, wherein the skill-based game further comprises: iteratively receiving a selection of a sequence of indicia from the plurality of indicia via the plurality of inputs; and adding an additional indicia from the plurality of indicia to the sequence each time the sequence is successfully completed until a particular quantity of indicia is reached.

Clause 10. The method of clause 9 or any other clause herein, further comprising: receiving a selection of an incorrect indicia from the sequence of indicia via one of the plurality of inputs; and stopping the skill-based game and determining the award for the wagering game as zero.

Clause 11. The method of clause 8 or any other clause herein, wherein generating the skill-based game on the display comprises generating an indicator corresponding to at least one of the plurality of indicia from the first portion of the wagering game.

Clause 12. The method of clause 8 or any other clause herein, further comprising: receiving, via one of the one or more computing devices, a selection of a particular indicia of the plurality of indicia as a first of the plurality of inputs; and changing, via one of the one or more computing devices, the particular indicia to a different indicia in response to receiving the selection.

Clause 13. The method of clause 8 or any other clause herein, further comprising: generating the skill-based game in response to the outcome of the first portion being a losing outcome; and refunding a percentage of a bet amount for the first portion in response to an outcome of the skill-based game being a winning outcome.

Clause 14. The method of clause 8 or any other clause herein, wherein the selectable components for the skill-based game consists exclusively of the plurality of indicia from the first portion of the wagering game.

Clause 15. A non-transitory computer-readable medium embodying a program that, when executed by at least one computing device, causes the at least one computing device to: generate an outcome for a first portion of a wagering game comprising a plurality of indicia; render a user interface comprising the plurality of indicia on a display; generate a skill-based game on the display using the plurality of indicia as selectable components for the skill-based game; receive a plurality of inputs individually corresponding to a respective one of the plurality of indicia; and determine an award for the wagering game based on the plurality of inputs.

Clause 16. The non-transitory computer-readable medium of clause 15 or any other clause herein, wherein the program further causes the at least on computing device to: generate a second outcome for the first portion of the wagering game; and in response to the second outcome comprising a winning combination of indicia, determine a second award for the wagering game based on the winning combination of indicia without generating the skill-based game.

Clause 17. The non-transitory computer-readable medium of clause 15 or any other clause herein, wherein the award for the wagering game comprises a percentage of a bet amount of the wagering game.

Clause 18. The non-transitory computer-readable medium of clause 17 or any other clause herein, wherein the percentage is 102%.

Clause 19. The non-transitory computer-readable medium of clause 15 or any other clause herein, wherein a first duration of the skill-based game is at least ten times longer than a second duration of the first portion of the wagering game.

Clause 20. The non-transitory computer-readable medium of clause 15 or any other clause herein, wherein the wagering comprises the first portion and the skill-based game.

These and other aspects, features, clauses, and benefits of the claims will become apparent from the detailed written description of the aforementioned aspects taken in conjunction with the accompanying drawings, although variations and modifications thereto may be effected without departing from the spirit and scope of the novel concepts of the disclosure.

What is claimed is:

1. A system, comprising:
- a display;
- a memory device; and
- at least one computing device communicatively coupled to the memory device and the display, the at least one computing device being configured to:
  - receive a selection of a bet amount;
  - generate an outcome for a first portion of a wagering game comprising a plurality of indicia, wherein generating the outcome for the first portion of the wagering game comprises:
    - shuffling a plurality of indicia strips of a plurality of reels, the plurality of indica comprise the plurality of indicia; and
    - stopping the plurality of indica strips at a position based on a result from a random number generator;
  - render a user interface comprising the plurality of indicia on the display;
  - generate a skill-based game on the display using the plurality of indicia as selectable components for the skill-based game;
  - receive a plurality of inputs individually corresponding to a respective one of the plurality of indicia; and
  - determine an award for the wagering game based on the plurality of inputs.

2. The system of claim 1, wherein the at least one computing device is further configured to analyze the plurality of inputs to determine an outcome of the skill-based game, wherein the award is based on the outcome of the skill-based game.

3. The system of claim 2, wherein the at least one computing device is further configured to determine the award as a percentage of the bet amount based on the outcome for the first portion of the wagering game being a losing outcome and the outcome of the skill-based game being a winning outcome.

4. The system of claim 1, wherein the at least one computing device is further configured to generate the skill-based game by:
- highlighting individual ones of a plurality of the plurality of indicia in a particular order; and
- determining whether the plurality of inputs correspond to the plurality of the plurality of indicia in the particular order.

5. The system of claim 1, wherein the at least one computing device is further configured to generate the skill-based game on the display based on the outcome of the wagering game.

6. The system of claim 5, wherein the at least one computing device is further configured to generate the skill-based game on the display in response to the outcome of the wagering game being a losing outcome.

7. A method, comprising:
- generating, via one of one or more computing devices, an outcome for a first portion of a wagering game comprising a plurality of indicia;
- rendering, via one of the one or more computing devices, a user interface comprising the plurality of indicia on a display;
- generating, via one of the one or more computing devices, a skill-based game on the display using the plurality of indicia as selectable components for the skill-based game, wherein the skill-based game comprises:
  - iteratively generating a random sequence of indicia from the plurality of indicia on the user interface;
  - iteratively receiving a selection of an input sequence of indicia from the plurality of indicia via a plurality of inputs, wherein the plurality of inputs individually correspond to a respective one of the plurality of indicia;
  - adding an additional indicia from the plurality of indicia to the random sequence each time the input sequence corresponds to the random sequence until a particular quantity of indicia is reached; and
  - determining an outcome for the skill-based game based on the particular quantity of indicia being reached; and
- determining, via one of the one or more computing devices, an award for the wagering game based on the plurality of inputs and the outcome for the skill-based game.

8. The method of claim 7, further comprising:
- receiving a selection of an incorrect indicia from the input sequence of indicia via one of the plurality of inputs; and stopping the skill-based game and determining the award for the wagering game as zero.

9. The method of claim 7, wherein generating the skill-based game on the display comprises generating an indicator corresponding to at least one of the plurality of indicia from the first portion of the wagering game.

10. The method of claim 7, further comprising:

receiving, via one of the one or more computing devices, a selection of a particular indicia of the plurality of indicia as a first of the plurality of inputs; and changing, via one of the one or more computing devices, the particular indicia to a different indicia in response to receiving the selection.

11. The method of claim 7, further comprising:

generating the skill-based game in response to the outcome of the first portion being a losing outcome; and refunding a percentage of a bet amount for the first portion in response to an outcome of the skill-based game being a winning outcome.

12. The method of claim 7, wherein the selectable components for the skill-based game consists exclusively of the plurality of indicia from the first portion of the wagering game.

13. A non-transitory computer-readable medium embodying a program that, when executed by at least one computing device, causes the at least one computing device to:

receive a selection of a bet amount;

generate an outcome for a first portion of a wagering game comprising a plurality of indicia, wherein generating the outcome for the first portion of the wagering game comprises:

shuffling a plurality of indicia strips of a plurality of reels, the plurality of indicia comprise the plurality of indicia; and stopping the plurality indicia strips at a position based on a result from a random number generator;

render a user interface comprising the plurality of indicia on a display;

generate a skill-based game on the display using the plurality of indicia as selectable components for the skill-based game;

receive a plurality of inputs individually corresponding to a respective one of the plurality of indicia; and determine an award for the wagering game based on the plurality of inputs.

14. The non-transitory computer-readable medium of claim 13, wherein the program further causes the at least on computing device to:

generate a second outcome for the first portion of the wagering game; and in response to the second outcome comprising a winning combination of indicia, determine a second award for the wagering game based on the winning combination of indicia without generating the skill-based game.

15. The non-transitory computer-readable medium of claim 13, wherein the award for the wagering game comprises a percentage of a bet amount of the wagering game.

16. The non-transitory computer-readable medium of claim 15, wherein the percentage is 102%.

17. The non-transitory computer-readable medium of claim 13, wherein a first duration of the skill-based game is at least ten times longer than a second duration of the first portion of the wagering game.

18. The non-transitory computer-readable medium of claim 13, wherein the wagering comprises the first portion and the skill-based game.

* * * * *